United States Patent

Ogino et al.

[11] Patent Number: 5,432,404
[45] Date of Patent: Jul. 11, 1995

[54] APPARATUS FOR DETECTING A GEOMETRIC DISTORTION OF AN IMAGE ON A DISPLAY DEVICE

[75] Inventors: Masanori Ogino; Takeo Yamada, both of Yokohama; Takashi Azuma, Yokohama; Jun Onoda, Kodaira, all of Japan

[73] Assignee: Hitachi, Ltd., Tokyo, Japan

[21] Appl. No.: 215,060

[22] Filed: Mar. 21, 1994

[51] Int. Cl.⁶ ............................................. H01J 31/26
[52] U.S. Cl. ........................................ 315/10; 348/813
[58] Field of Search .................... 315/10, 368.13, 11.5; 348/813

[56] References Cited

U.S. PATENT DOCUMENTS

| | | | |
|---|---|---|---|
| 4,760,453 | 7/1988 | Hieda | 358/213.16 |
| 4,980,614 | 12/1990 | Yamada et al. | |
| 5,272,536 | 12/1993 | Sudo et al. | 358/213.15 |
| 5,345,262 | 9/1994 | Yee et al. | 348/177 |

FOREIGN PATENT DOCUMENTS 1-60996 12/1989 Japan .
5-37825 2/1993 Japan .

*Primary Examiner*—Theodore M. Blum
*Attorney, Agent, or Firm*—Evenson, McKeown, Edwards & Lenahan

[57] ABSTRACT

For the purpose of detecting a geometric distortion of an image on a screen of a CRT display device, i.e., the deviation of the positional coordinates at a high speed and with a high accuracy, the positions of window images having about 10 rows and 10 columns which are arranged in a matrix on the screen of the display device, including a screen frame, are photographed through a predetermined low-pass filter by a monochromatic CCD camera, and further, both the low-light field picture and the high-light field picture are photographed, whereby the positions of the window images can be detected with a high accuracy within 0.1 CCD pixel by the elimination of a dark current, the normalization of detection sensitivity and the interpolation calculation. Therefore, the detection of the geometric distortion can be performed at a high speed and with a high accuracy by an inexpensive monochromatic CCD camera which has the number of pixels less than the total number of pixels of the display device.

7 Claims, 8 Drawing Sheets

APPARATUS FOR DETECTING A GEOMETRIC DISTORTION OF AN IMAGE ON A DISPLAY DEVICE

CROSS-REFERENCES TO RELATED APPLICATION

The application relates to U.S. Pat. No. 4,980,614, entitled "CONVERGENCE CORRECTION CIRCUIT" issued on Dec. 25, 1990, to Masanori Ogino et al, all of the disclosure of which are incorporated by reference. Moreover, the application relates to U.S. patent application Ser. No. 08/115,025, filed on Sep. 2, 1993, (corresponding to JP-A-5-37825), entitled "Multi-Scan Type Display System with Pointer Function" by Masanori Ogino et al, all of the disclosure of which are incorporated by reference.

BACKGROUND OF THE INVENTION

The present invention relates to an apparatus which is capable of detecting automatically a geometric distortion of an image on a screen of a CRT display device. This invention also relates to a high fidelity camera device free from dark current deviations and from sensitivity deviations.

As well known, a CRT direct viewing display device generates a geometric distortion having a pincushion-like shape (hereinafter, referred to as "the pincushion distortion" for short, when applicable) due to the principle of the electromagnetic deflection. In addition, a CRT projection display device further generates a geometric distortion having an approximately trapezoidal shape due to the oblique projection.

As well known, the display device has a built-in correction circuit which operates to eliminate those distortions. In this connection, the tendency of late years is that the circuit for correcting a geometric distortion in the CRT projection type display device employs a digital convergence circuit.

In the digital convergence circuit, a display screen is represented by approximately 10×10 (100 in total) matrix-like lattice points. In this connection, the accurate positional adjustment can be performed independently at every lattice point.

However, in the above-mentioned prior art, the detection of the positional deviation of each lattice point (the dislocation of each lattice point from the associated normal position) was carried out through eyes of a human being. It took about 20 seconds for one lattice point and 2,000 seconds for 100 lattice points, i.e., about 30 minutes for 100 lattice points in order to adjust the positional deviation of all the lattice points.

The above-mentioned time required for the positional adjustment was applied to the monochromatic display device, and therefore, in the case of the three-primary-colors color display device, it took about 90 minutes in order to adjust the positional adjustment of all the lattice points.

For the purpose of shortening the above-mentioned considerable time required for the positional adjustment in the manufacturing process, the experiments were performed such that 10×10 sets of photodetector arrays (or camera arrays) were arranged near the screen of the display device. Prior art adopting a camera array system is described in JP-B2-1-60996. However, since the camera array system is expensive and is difficult to be transported, the application thereof to the field service was thus difficult. In addition, the prior art apparatus was based on the principle which is established in the inside of the so-called Nyquist limit.

SUMMARY OF THE INVENTION

It is an object of the present invention to provide an apparatus for detecting a geometric distortion and an apparatus for automatically adjusting convergence which are capable of automatically detecting a geometric distortion of an image on a high definition display device by using one low definition CCD (Charged Coupled Device) camera.

In general, by the high definition display device, it means such a display device as to have the effective display scanning lines of 1,000 or more and the total number of pixels of 1,000×1,000 or more. In addition, by the monochromatic low definition camera, it means such a camera as to have the total number of pixels of about 500×500. Further, the required accuracy of detecting a geomertic distortion is within 0.2 pixel which is measured on the basis of the screen pixels of the image on the screen of the high definition display device, i.e., within 0.1 pixel which is measured on the basis of the pixels on the surface of CCD (hereinafter, referred to as "the CCD pixels" for short, when applicable).

That is, it is therefore an object of the present invention to provide an apparatus which is capable of detecting a geometric distortion on the basis of the principle which is established beyond the so-called Nyquist limit.

Incidentally, the case where the pixel size of the display device is larger than that of the detector is called "the inside of the Nyquist limit" while the case where the pixel size of the display device is smaller than that of the detector is called "the outside of the Nyquist limit".

The main point of the detection of the geometric distortion is to accurately detect the positions of the about 100 lattice points on the screen of the display device. Therefore, in the following description, the detection of the geometric distortion will be referred to as the detection of the positions of the lattice points in many cases.

The apparatus for detecting a geometric distortion according to the present invention includes, in addition to a solid-state image taking camera with a matrix-like pixel arrangement, such as a monochromatic CCD camera, the following means;

(1) lens means provided with optical low-pass filtering effect,
(2) means for eliminating a dark current which is provided for each pixel,
(3) means for normalizing detection sensitivity which is provided for each pixel, and
(4) means for detecting an image position on the basis of the interpolation principle.

The above-mentioned means, which constitute the apparatus of the present invention, will act in the following manner. The monochromatic CCD camera operates to screen the whole catch of the display device in the field of view of the CCD camera and store the signals corresponding thereto. The lens means provided with optical low-pass filtering effect is arranged in a space between the surface of CCD and the picture plane of the display device and operates to scumble, on the surface of CCD, one point of the image on the screen of the display device into the size of which diameter is within one camera pixel to 6 camera pixels. Thus, the frequency components in the Nyquist limit (0.5 cycle per pixel) can be attenuated by about 3 dB or more (on the basis of the theory of the Fourier transform).

On the screen of the display device, the 100 window signals are displayed in the corresponding positions of approximately 10×10 lattice points. This state is illustrated in FIG. 1. In the figure, the reference numeral 1 designates a screen frame, the reference numeral 2 designates a typical one of a plurality of windows which are light portions. The outside portion of the windows (i.e., the portion between the windows) is a dark portion.

The object of the provision of the means for eliminating a dark current, which is provided for each pixel, is to eliminate the detection error due to the dark current as one of the noises of CCD and to eliminate the detection error due to the outside light illumination from the circumference of the display device. The object of the provision of the means for eliminating a dark current is attained by subtracting the low-light field signal screen photographing output from the window screen photographing output.

The object of the provision of the means for normalizing detection sensitivity, which is provided for each pixel, is to eliminate the positional detection error due to the difference in sensitivity between the CCD pixels two by two. The object of the provision of the means for normalizing detection sensitivity is attained by dividing the window screen photographing output by the high-light field signal screen photographing output.

According to the interpolation principle, the pixels in the vicinity of the boundaries of the windows are extracted from the window screen photographing output data, and the accurate positions of the boundaries are detected.

Still another object of the present invention is to offer a high fidelity camera device free from dark deviations and from sensitivity deviations, which can be attained by (2) and (3) as mentioned above.

DESCRIPTION OF THE PREFERRED EMBODIMENTS

The preferred embodiments of the present invention will hereinafter be described in detail with reference to the accompanying drawings.

Figure 1:
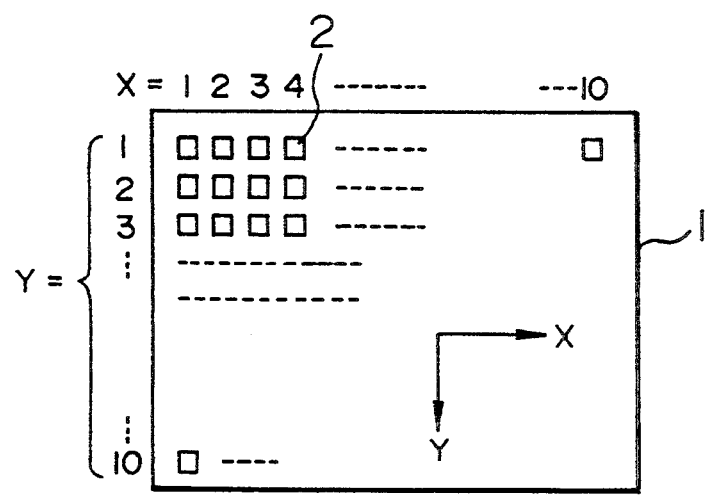
FIG. 1 is a plan view showing a window pattern on a screen of a display device in an embodiment of the present invention.

A configuration of a first embodiment of the present invention is shown in FIG. 1. In the figure, the reference numeral 1 designates a display screen, the reference numeral 3 designates a lens for a camera, the reference numeral 4 designates an optical low-pass filter, the reference numerals 3 and 4 together designate lens means provided with optical low-pass filtering effect. The reference numeral 5 designates a group of CCDs and an accessory processing amplifier, the reference numeral 6 designates an A/D converter, and the reference numerals 7, 8 and 9 designate frame memories, respectively. The display screen 1 may be one of CRT tube as shown in FIG. 1, or the display screen to be projected with images for three color CRT tubes in a rear projecting type television device. In this connection, the reference numeral 7 designates a frame memory for storing data $D_P$ corresponding to the window signals as has already been described above, the reference numeral 8 designates a frame memory for storing data $D_H$ corresponding to the above-mentioned high-light field signal, and the reference numeral 9 designates a frame memory for storing data $D_D$ corresponding to the above-mentioned low-light field signal. In addition, the reference numerals 10 and 11 designate respectively subtracters in the outputs of which $(D_P-D_L)$ and $(D_H-D_L)$ are obtained. The reference numeral 12 designates a divider in the output of which $(D_P-D_L)/(D_H-D_D)$ is obtained. The reference numeral 13 designates a frame memory, and the reference numeral 14 designates an interpolation calculation unit. Herein-above, the description of the configuration of the first embodiment has been completed. Next, the operations of the means of the first embodiment will hereinbelow be described.

The image on the whole screen of the display device is focused on the surface of the monochromatic CCD pixels of about 500×500 through the lens 3. The low-pass filter 4 has the function of scumbling one point on the screen of the display device into the size in which the half value breadth corresponds to about the two pixels on the surface of the CCD pixels. More specifically, a photo-diffusion plate or diffraction grating is used as the low-pass filter 4.

As the alternative means of the low-pass filter, the means can be alternatively employed such that the position of the focal point of the lens 3 is intentionally, simply shifted to generate the deviation bias of the focal plane.

Figure 3:
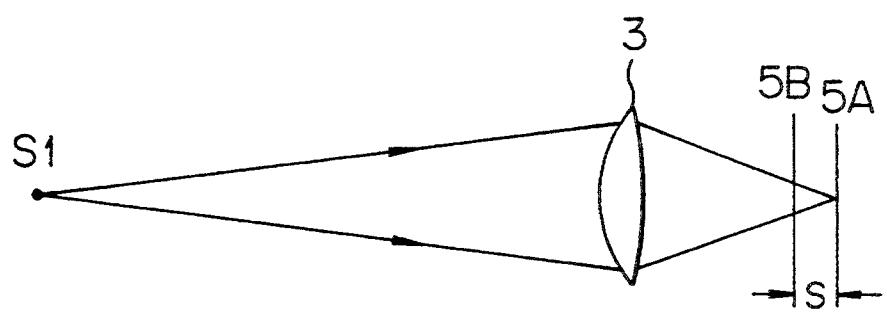
FIG. 3 is a view showing an optical arrangement of one example of optical low-pass filtering means in the embodiment of the present invention.
Figure 4:
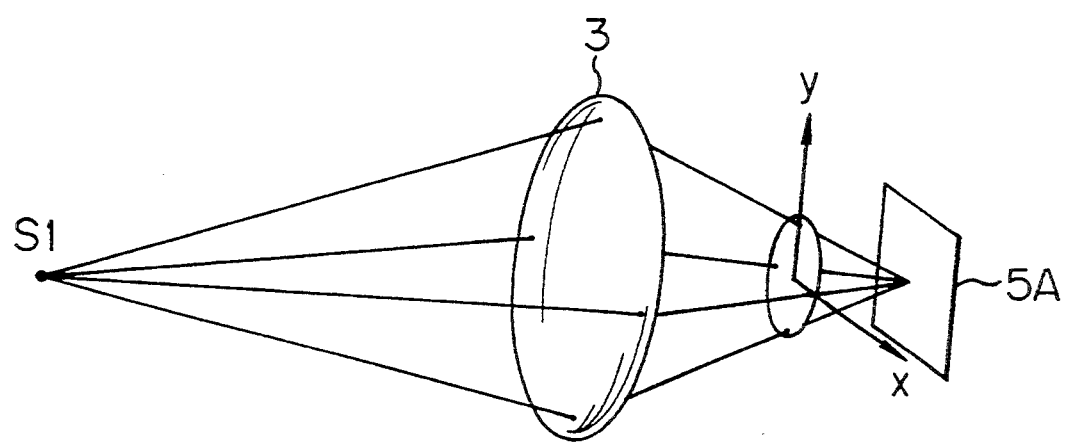
FIG. 4 is a perspective view useful in explaining the operation of the optical low-pass filtering means shown in FIG. 3.

That is, as shown in FIGS. 3 and 4, the light beams which have been emitted from one point light Sl on the high definition image screen are focused through the lens 3, thereby forming a sharp image on a just focus plane 5A. The scumbled image is projected on an off focus position 5B which is deviated from the just focus plane 5A by the distance S. The point spread function due to the deviation bias of the focal plane becomes, as shown in the graph 15 of FIG. 5, a semicircle having a diameter of D. In this connection, the diameter D of the semicircle increases in proportion to the deviation bias of the focal plane. That is, the diameter D increases as the distance S from the just focus plane 5A further increases.

Figure 6:
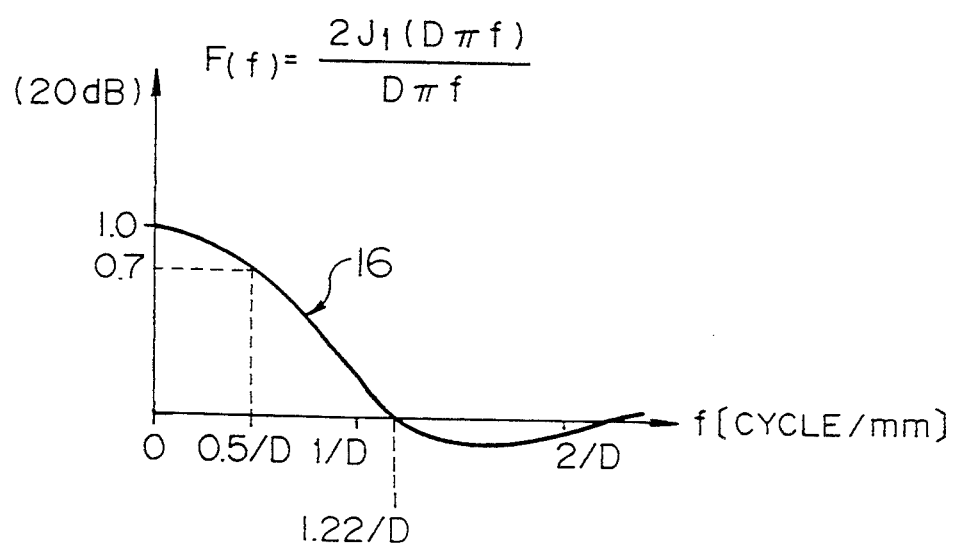
FIG. 6 is a graphical representation showing the frequency characteristic corresponding to FIG. 5.

The spatial frequency characteristic corresponding to the point spread function is given by the graph 16 shown in FIG. 6. In the figure, J1 is the first-order Bessel function of the first kind. Therefore, if the diameter D of the point spread function is selected so as to be larger than the size of one CCD pixel, the response to the Nyquist limit frequency (0.5 cycle/pixel) has the attenuation of about 70%, i.e., 3 dB or more. Hereinabove, the first description with respect to the low-pass filtering effect of the lens means has been completed. The succeeding description thereof will be given in more detail later.

Figure 2:
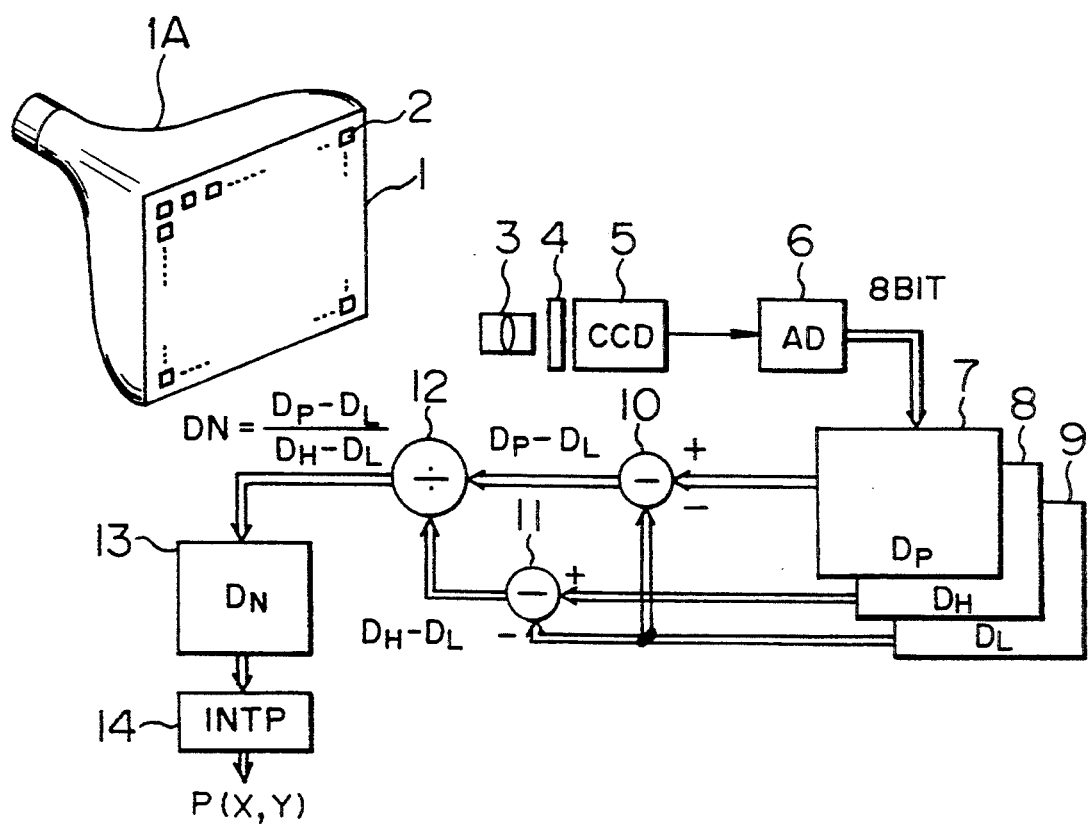
FIG. 2 is a block diagram showing a configuration of the embodiment of the present invention.

Means for eliminating a dark current, which is provided for each CCD pixel, is embodied by the two subtracters 10 and 11 shown in FIG. 2. That is, in the output signals of the subtracters, the error due to the dark current is effectively eliminated.

Means for normalizing detection sensitivity, which is provided for each CCD pixel, is embodied by the divider 12 shown in FIG. 2. That is, in the output signal of the divider, both the error due to the dark current of each element of CCD and the error due to the difference in sensitivity between the pixels are effectively eliminated. In addition, in the output signal, the error due to the local brightness non-uniformity of the image itself on the display device is also effectively eliminated.

Furthermore, disadvantageous corner sensitivity loss of (cosine)$^4$ law can also be compensated. Therefore, if that output signal is analyzed to obtain the position having the 50% brightness of the boundary portion of the window signals, it is possible to perform the accurate positional detection.

Next, the description will hereinbelow be given with respect to the operation of the interpolation calculation unit 14.

Figure 7:
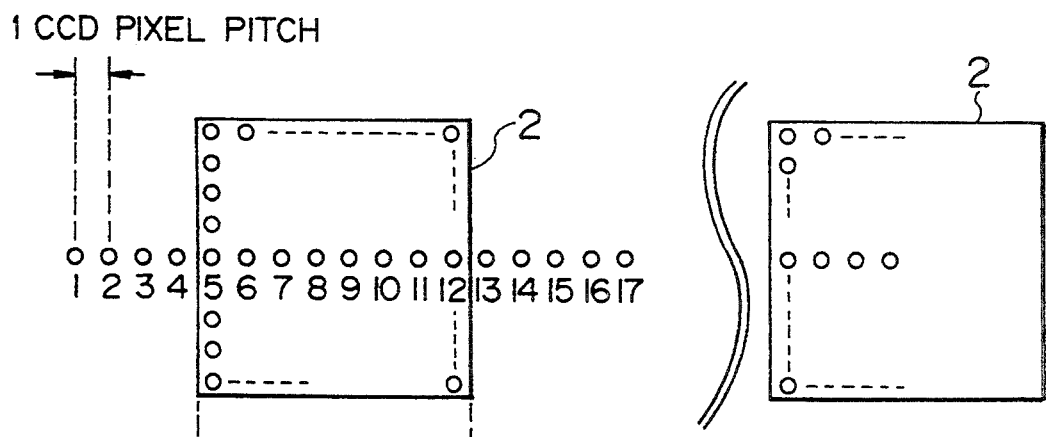
FIG. 7 is a view showing a horizontal pixel line which is located at the central portion of one window in the embodiment of the present invention.

FIG. 7 shows one window 2 (an example is shown in which one window has the size of 8×8 CCD pixels) and a line of the CCD pixels 1 to 17 which cross horizontally the central portion of one window 2. The values of the normalized data (the data $D_N$ stored in the frame memory 13 of FIG. 2) corresponding to the CCD pixel line are represented in the form of a graph in FIG. 8. In the figure, the axis of abscissa x represents the horizontal CCD pixel number. In the case of the example of FIG. 8, the x value of the 50% point of the leading portion is between the x-coordinates 4 and 5. Further, the x value of the 50% point of the trailing portion is between the x-coordinates 12 and 13.

Assuming that the accurate x value of the 50% point is x(0.5), the x-coordinates (integral numbers) of the data adjacent to the 50% point are n and n', and D(n) is a value smaller than 50% and D(n') is a value equal to or larger than 50%, x(0.5) can be calculated on the basis of the following expression 1 (the linear interpolation formula).

$$x(0.5) = \frac{0.5 - D(n)}{D(n') - D(n)} + n \tag{1}$$

Next, the description will hereinbelow be given with respect to the noticeable matters for attaining the positional detection accuracy (0.1 CCD pixel) as the objective of the present invention. In order to obtain the accuracy of 0.1 CCD pixel, the value of x(0.5) needs to be obtained with an accuracy of 0.1. In order to fulfill this requirement, the relationship between the gradient K of the graph of FIG. 8 and the error $\Delta D$ of $D(x)$ needs to fulfill the following expression 2.

$$\Delta D \geqq 0.1 \, K \tag{2}$$

Figure 8:
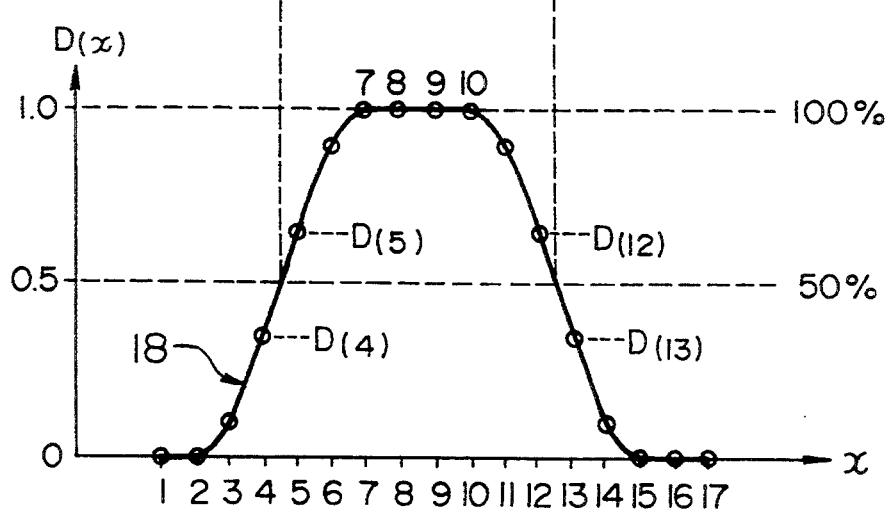
FIG. 8 is a graphical representation showing the data corresponding to FIG. 7.
Figure 9:
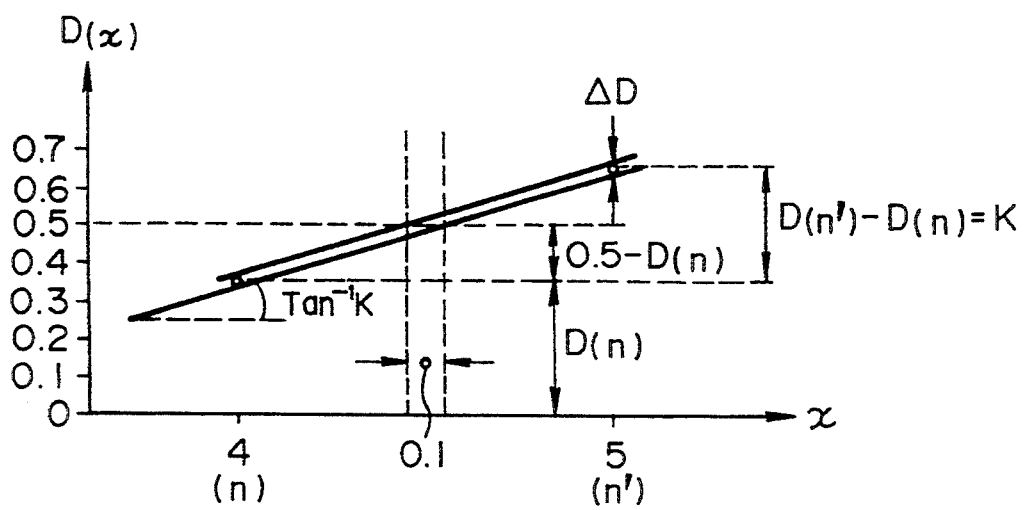
FIG. 9 is a partially enlarged view of the graph shown in FIG. 6.

The meaning of the expression 2 will be readily understood from FIG. 9 as the partially enlarged view of FIG. 8. In the case of FIG. 9, since the value of K is about 0.3, the error $\Delta D$ needs to be within 0.03.

Next, let us consider the primary factors of the error $\Delta D$. $\Delta D$ is the error of $D(x)$ and $D(x)$ is the data $D_N$ stored in the frame memory 13 shown in FIG. 2. In this connection, the data $D_N$ is given by the following expression 3.

$$D_N = \frac{D_P - D_L}{D_H - D_L} = \frac{D_P(1 - D_L/D_P)}{D_H(1 - D_L/D_H)} \tag{3}$$

Therefore, the error $\Delta D_N$ of the data $D_N$ is given by the following expression 4.

$$\left\{ \begin{array}{l} \Delta D_N \approx \dfrac{D_P}{D_H} \left( \dfrac{\Delta D_P}{D_P} - \dfrac{\Delta D_H}{D_H} \right) \\ \because \Delta D \equiv |\Delta D_{NPP}|_{MAX} \approx 0.5(0.02 + 0.02) = 0.02 \end{array} \right\} \tag{4}$$

In the final concrete numerical example in the above expression 4, it is taken into consideration that the actual S/N ratio value (N is the peak-to-peak value of the noise component) of CCD is about 100 (i.e., 40 dB). The value of $\Delta D$ is 0.02, and therefore, it will be readily understood that the above-mentioned accuracy objective (within 0.03) of the present invention is attained.

In addition, as for the method of reducing the error of $\Delta D$, the statistical law can be utilized in which the dispersion of the average of the evaluation factor decreases in proportion to the square root of the number of samples. That is, in FIG. 5, instead of the utilization of the data of the CCD pixel line 17 on one scanning line, the average of the data of the CCD pixel line on the four parallel scanning line is utilized, whereby the S/N ratio can be improved by 6 dB. In addition, in FIG. 6, the average of the positional coordinates of the 50% point of the leading portion and the positional coordinates of the 50% point of the trailing portion is obtained, whereby the S/N ratio can be improved by 3 dB. Thus, the improvement of 9 dB in total is achieved.

Those improvements are realized on the basis of the well known statistical law in which the dispersion of the averages of the evaluation factor decreases in inverse proportion to the square root of the number of samples. By the interpolation calculation, the unit 14 outputs the signal P(X, Y) indicating the centroid position of each window 2.

Hereinabove, the description of the interpolation calculation unit shown in FIG. 2 has been completed.

Next, the description will hereinbelow be given with respect to the relationship between the spread diameter D of the low-pass filter shown in FIG. 5 and the gradient K of the boundary portion between the windows shown in FIG. 9. With respect to that relation-ship, if the calculation is performed in the case where the two CCD pixels are located in the equal distance from the 50% point, the following expression 5 is consequently obtained while omitting its guiding process.

$$K = \frac{4}{\pi} \cdot \frac{1}{D} \cdot \sqrt{1 - \frac{1}{D^2}} \quad (5)$$

Figure 5:
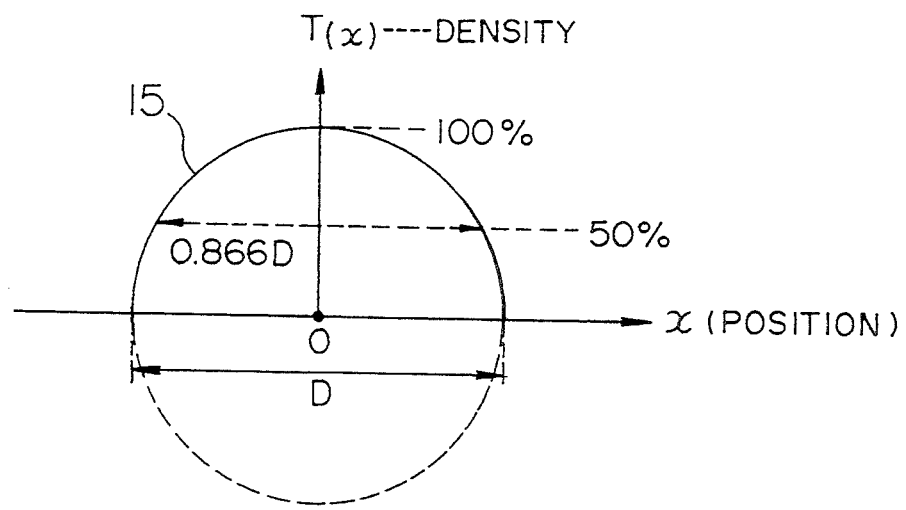
FIG. 5 is a graphical representation showing the point spread distribution of the deviation bias of the focal plane through an optical lens.

K means the value T(0.5) in FIG. 5, i.e. the quotient that $\sqrt{D^2 - 1/2}$ is divided by the area of half circle $\pi D^2/8$.

Figure 10:
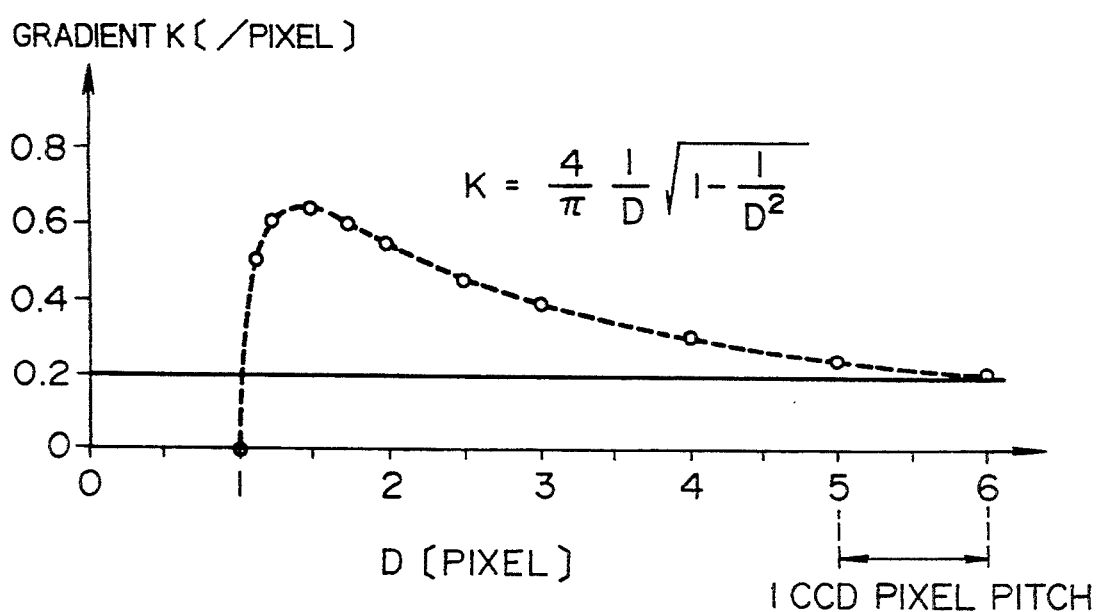
FIG. 10 is a graphical representation showing the effective region of the optical low-pass filtering means in the embodiment of the present invention.

The expression 5 is shown in the form of the graph in FIG. 10.

In the above-mentioned expression 2, if the actual value 0.02 of the above-mentioned ΔD is substituted, the value of K becomes a value equal to or larger than 0.2.

The value of the spot spread diameter D in order to fulfill that the value of K becomes a value equal to or larger than 0.2 is in the range of 1 to 6 pixels from FIG. 10. That is, it is desirable that the spot spread diameter of the optical low-pass effect, which is to be applied to the present invention, is in the range of 1 to 6 CCD pixels. Selecting the diameter to be larger than one pixel corresponds to the objective of this invention to apply beyond Nyquist limit.

Although the description has been given with respect to the detection of the horizontal position, this description is also applied to the detection of the vertical position.

Hereinabove, the description of the first embodiment of the present invention has been completed.

Next, the description will hereinbelow be given with respect to the applied example of the above-mentioned first embodiment.

As described above, in the present invention, the whole picture on the display device, including the screen frame, is photographed collectively by the monochromatic CCD camera. The data of the high-light field picture is analyzed, whereby the shape of the screen frame can be recognized. Therefore, on the basis of the principle of the protective geometry, it is possible to deduce the proper positions of the windows corresponding to approximately 10×10 lattice points. Means for deducing the proper positions is described later on as the third embodiment of the present invention.

Therefore, if the position of each window can be accurately detected in accordance with the present invention, the deviation from the proper position of each window can be calculated. Therefore, the deflection circuit or auxiliary deflection circuit of the CRT display device is controlled by the special means so as to eliminate that deviation, whereby it is possible to eliminate the geometric distortion of the image on the screen of the display device. Such special means is well known from U.S. Pat. No. 4,980,614 given to the present inventors.

In U.S. Pat. No. 4,980,614, there is presented the digital convergence correction circuit for use in the multiscanning display device.

If the present invention is applied to the three-primary-colors color display device, the apparatus of the present invention becomes the convergence deviation detecting apparatus. Therefore, by combining the apparatus of the present invention with the circuit disclosed in U.S. Pat. No. 4,980,614, it is possible to actually embody an automatic convergence adjusting apparatus.

Figure 11:
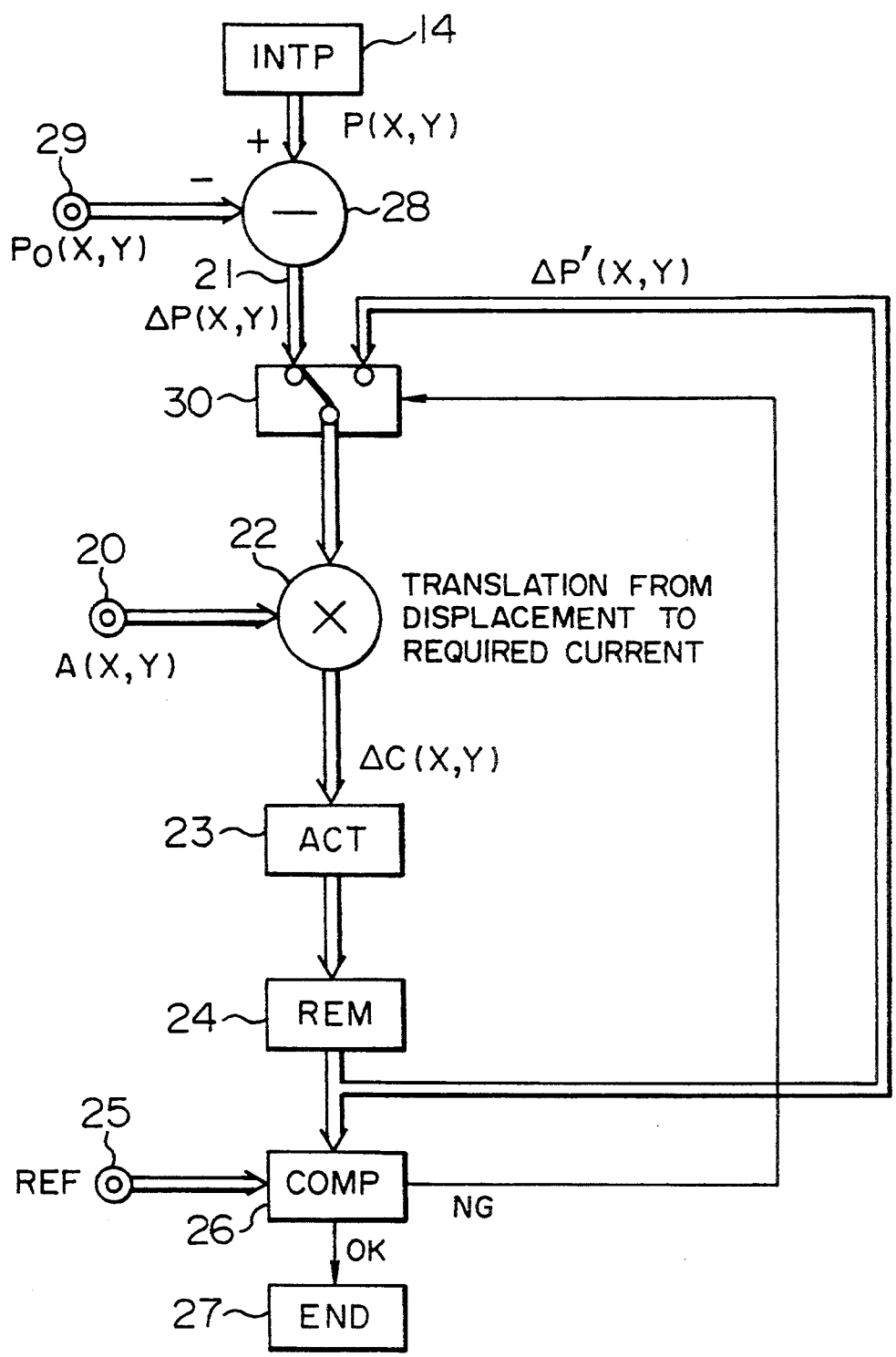
FIG. 11 is a block diagram showing a configuration of another embodiment of the present invention.

The essential matters for embodying the automatic convergence adjusting apparatus is shown in FIG. 11 as a second embodiment of the present invention.

In the figure, an interpolation calculation unit INTP 14 has the same configuration as that of FIG. 2. The output P(X, Y) of the interpolation calculation unit 14 is the display position detection output of each window. The reference numeral 28 designates a subtracter, and the reference numeral 29 designates an objective position Po(X, Y). Both P(X, Y) and Po(X, Y) are input to the subtracter 28, and as a result, as its output, a display position deviation ΔP(X, Y) designated by the reference numeral 21 is obtained.

The reference numeral 22 designates a multiplier which operates to multiply a proportional constant for translating the positional deviation into the required quantity of correction current, which is to be caused to flow through a deflecting coil for deflecting the electron beams of the display device employing CRT. That proportional constant is a constant which is determined at every position of the window on the picture plane of the CRT display device.

The proportional constant is input in the form of A(X, Y) from an terminal 20.

Therefore, in the output of the multiplier, the quantity of required deflecting current is obtained in the form of ΔC(X, Y). That output is transmitted to a circuit for controlling a deflecting current (ACT) 23 of the display device, and then, the deflecting quantity of CRT beams is given to each of all the windows on the screen of the display device. The result is re-measured in accordance with the structure of the above-mentioned figure. The re-measurement work is, in FIG. 11, collectively illustrated in the form of REM 24. The circuit which is disclosed in U.S. Pat. No. 4,980,614 is utilized in the block 23.

The signal representing the positional deviation signal ΔP'(X, Y) after the re-measurement is compared with an objective error value by a comparator designated by the reference numeral 26. The objective error value Ref is input from a terminal 25. If the magnitude of the positional deviation signal is smaller than that of the objective error value, there is no problem, and thus, the adjustment work will be completed. If the magnitude of the positional deviation signal is larger than that of the objective error value, then, the adjustment work will be again carried out. A revised position deviation (ΔP'(X, Y)) is fed back via the switcher 30 to pass to 22, 23, and 24. After several automatic repetitions, the residual position deviation becomes small enough to pass the comparator 26 to get to the END 27. Therefore, according to the present embodiment, the automatic convergence adjustment can be achieved. Hereinabove, the description with respect to the second embodiment of the present invention has been completed.

In the case where the apparatus of the present invention is used as the apparatus for detecting a geometric distortion for use in the multiscanning display device, it is desirable that the exposure time of the CCD camera, i.e., the image accumulating time is made an integral multiple of the vertical scanning period of the image on the display. The means therefor has already been filed, as U.S. patent application Ser. No. 08/115,025 (corresponding to JP-A-37825) by M. Ogino et al.

Alternatively, as the asynchronous alternative measure, it is effective that the image accumulating time of the monochromatic CCD camera is made about 16 times or more as long as the vertical scanning period of the display image (about 16 msec) because the image accumulating time is made 16 times as long as the vertical scanning period, whereby the measurement error due to the asynchronous operation can be reduced to 1/16 or less. As can be seen from the above-mentioned FIG. 10, the maximum value of the gradient K is about 0.6, and therefore, from the expression 2, ΔD i.e. the error of D(x) needs to be within 0.06 (1/16).

Hereinabove, the description of FIG. 11 has been completed. Next, the description will hereinbelow be given with respect to a method wherein the screen frame 1 shown in FIG. 1 is recognized by the camera, and on the basis of the recognized result, the proper position which the center of gravity of each window 2 should occupy is calculated. In FIG. 2, if the lens 3 for the camera is arranged on the central optical axis on the screen surface of the display device, there arises no difficult problem. However, in the actual field of the maintenance work, it is difficult to fulfill rigidly the above-mentioned condition. In such a case, the image of the screen frame on the surface of CCD does not become a rectangle, but becomes a distorted trapezoid. The exact solution in such a case can be obtained by using both the geometry and algebra with respect to the perspective. However, the calculation inevitably requires very voluminous calculation time.

On the other hand, it is easy in the field of the normal maintenance work that the angular error of the arrangement position of the camera is reduced within about 10 degrees. Then, if the above-mentioned exact solution is changed under the condition of that angular error by the application of the law of nature to obtain the approximate expression which requires the short necessary calculation time, it will be advantageous.

The detailed description will hereinbelow be given with respect to a third embodiment of the present invention.

Firstly, there will hereinbelow be shown the means for recognizing the positional coordinates of four corners, which is defined by the screen frame, on the camera side.

Figure 12:
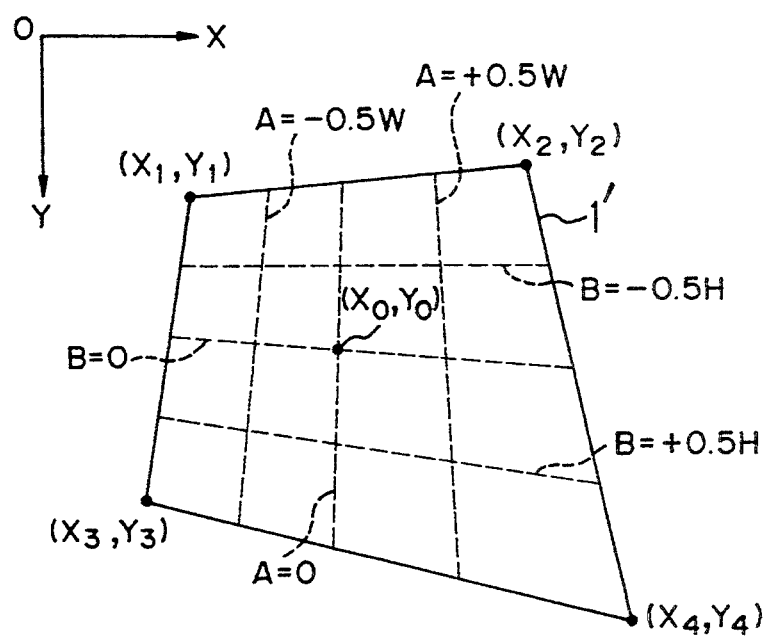
FIG. 12 is a view useful in explaining both a shape of a screen frame on a surface of CCD when viewed perspectively and the definition of the coordinate system thereof.

In FIG. 12, a shape of the screen frame which is imaged on the surface of CCD is designated by the reference numeral 1'. The positional coordinates of the four corners $(X_1, Y_1)$, $(X_2, Y_2)$, $(X_3, Y_3)$, $(X_4, Y_4)$ are defined as in the figure. Those coordinates can be readily obtained on the basis of the analysis with respect to the difference data which is obtained by subtracting the afore-mentioned low-light field picture data from the afore-mentioned high-light field picture data. For example, if the coordinate point of interest is the coordinate point of the top left-hand corner, the combination can be obtained in which the sum of the coordinate values X and Y becomes minimum among the coordinate points in each of which the data value becomes about 50%.

Hereinabove, the description of the means for calculating the CCD positional coordinates of the four corners has been completed. Next, there will hereinbelow be shown the means for calculating the coordinates (X, Y) on CCD as a function of the rectangular coordinates (A, B) on the screen of the display device. This means employs both the horizontal distortion F due to the horizontal angular dislocation between the optical axis of the camera and the optical axis of the screen of the display device, and the vertical distortion G due to the vertical angular dislocation therebetween. The quantities of the factors F and G are respectively defined by the following expression 6.

$$\left. \begin{array}{l} F = \dfrac{Y_4 - Y_2 - (Y_3 - Y_1)}{Y_4 - Y_2 + Y_3 - Y_1} \\[6pt] G = \dfrac{X_4 - X_3 - (X_2 - X_1)}{X_4 - X_3 + X_2 - X_1} \end{array} \right\} \quad (6)$$

Figure 13:
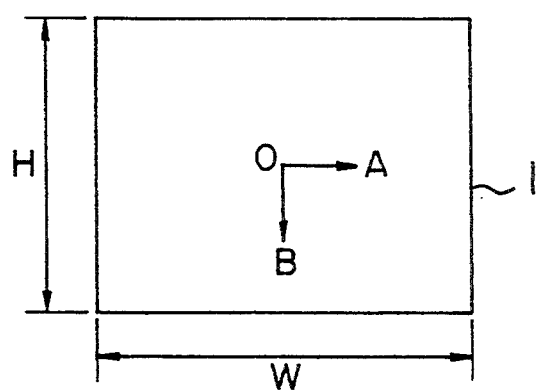
FIG. 13 is a view useful in explaining the definition of the coordinate system on the screen of the display device.

The rectangular coordinates (A, B) on the screen of the display device are shown in FIG. 13. In the figure, the reference symbol H designates a height of the screen, and the reference symbol W designates a width of the screen. In this connection, the origin is located at the center of the screen. The CCD coordinates $(X_o, Y_o)$ corresponding to the central portion of the screen of the display device can be obtained on the basis of the expression 7.

$$\left. \begin{array}{l} X_0 = \dfrac{X_1 + X_2 + X_3 + X_4}{4} + \dfrac{X}{2} F \\[6pt] Y_0 = \dfrac{Y_1 + Y_2 + Y_3 + Y_4}{4} + \dfrac{Y}{2} G \\[6pt] X \equiv \dfrac{X_4 - X_3 + X_2 - X_1}{2} \\[6pt] Y \equiv \dfrac{Y_4 - Y_2 + Y_3 - Y_1}{2} \end{array} \right\} \quad (7)$$

The objective coordinates X(A, B) and Y(A, B) are respectively expressed by the expression B.

$$\left. \begin{array}{l} X = X_0 + \dfrac{X}{W} A + 2FX\left(\dfrac{A}{W}\right)^2 + \\[6pt] \quad GX\dfrac{B}{H} + (X_3 - X_1 + X_4 - X_2)\dfrac{B}{H} \\[6pt] Y = Y_0 + \dfrac{Y}{H} B + 2GY\left(\dfrac{B}{H}\right)^2 + \\[6pt] \quad FY\dfrac{A}{W} + (Y_4 - Y_3 + Y_2 - Y_1)\dfrac{B}{W} \end{array} \right\} \quad (8)$$

The proper position which the center of gravity of each window 2 shown in FIG. 1 should occupy is previously known by using the coordinates (A, B) On the screen of the display device. For example, the value of A is 0, ±0.1W, ±0.2W, ±0.3W or ±0.4W. On the other hand, the value of B is 0, ±0.1H, ±0.2H, ±0.3H or ±0.4H. The coordinate values of (X, Y) corresponding to those individual values are obtained on the basis of the expression 8 and then each of those values thus obtained is applied as Po(X, Y) to the terminal 29 shown in FIG. 11, whereby the geometric distortion can be automatically removed. Hereinabove, the description of the third embodiment of the present invention has been completed.

Figure 14A:
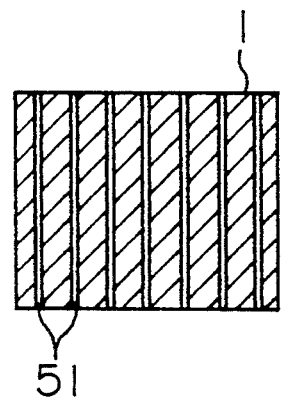
FIGS. 14A and 14B are views showing a changed example of the shape of the window.
Figure 14B:
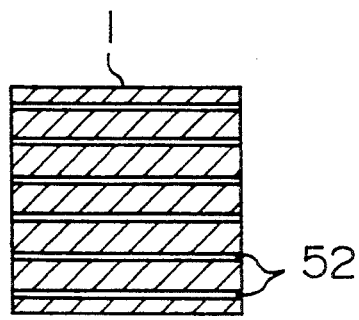

Next, the supplementary description will hereinbelow be given with respect to the conditions which each of the window images (designated by the reference numeral 2 in FIG. 1) is to have in each of the above-mentioned embodiments. The shape of the window is not necessarily square, but may be lengthwise or laterally long. For example, the technique can be usable such that a vertical-stripped window column 51 as shown in FIG. 14A and a horizontal-stripped window line 52 as shown in FIG. 14B are utilized in the time series manner. In FIGS. 14A and 14B, the slant line portion is the dark portion. In this connection, the reference numeral 1 designates the screen frame. However, the width of each window on the screen of the display device should not be too small. More specifically, as compared with the half of the diameter of the point spread function which was already described with reference to FIG. 5, the width of the window 2 shown in FIG. 7 needs to be made larger. This is necessary in order not to harmfully affect the location of the 50% slicing point which was already described with reference to FIG. 8.

As set forth hereinabove, according to the present invention, the positions of the windows on the screen of the display device can be detected with a high accuracy within 0.1 pixel of the monochromatic CCD camera pixel and at a high speed. Accordingly, the geometric distortion of the image on the display device can be detected with a high accuracy.

Therefore, if the present invention is applied to the color display device, both the geometric distortion and the convergence deviation can be detected at a high speed and with a high accuracy.

Actually, as a result of using the apparatus of the present invention with being combined with the circuit disclosed in U.S. Pat. No. 4,980,614, it was confirmed that the convergence adjustment can be attained for a short time 1/10 times or less as short as that of the prior art.

Also the camera device equipped with dark-current eliminating means and detection sensitivity normalizing means of this invention can present a high fidelity camera which can overcome the drawbacks of the prior art such as dark current errors, detection sensitivity errors and (cosine)$^4$ corner loss.

Accordingly, the present invention has enough industrial value.

We claim:

1. An apparatus for detecting a geometric distortion of an image on a display device, in which positions of window images are arranged in a matrix having m rows and n columns (m, n: integral number) on a screen of the display device, said apparatus comprising:

camera means provided with a matrixed pixel arrangement;

lens means provided with optical low-pass filtering effect;

means for eliminating a dark current which is provided for each pixel;

means for normalizing detection sensitivity which is provided for each pixel;

means for calculating a boundary position (a 50% point) of each window image on the basis of an interpolation principle, wherein said camera means operates to photograph and store the whole image on the screen of the display device, the whole image being made up of a low-light field picture, a high-light field picture and a window picture, said dark current eliminating means is composed of substructures, the substructures operating to firstly subtract a low-light field picture image from a high-light field picture image and to secondly subtract the low-light field picture image from a window picture image, said detection sensitivity normalizing means is composed of a divider, the divider operating to divide the second subtraction result by the first subtraction result, said boundary position detecting means operates to calculate positional coordinates of a 50% point by the interpolation principle on the basis of positional coordinates and data values D(n) of two adjacent pixels, the data values of said adjacent two pixels sandwiching the 50% value.

2. An apparatus for detecting a geometric distortion according to claim 1, wherein said low-pass filtering effect is achieved by a deviation bias of a focal plane of the lens for the camera.

3. An apparatus for detecting a geometric distortion according to claim 2, wherein the deviation bias of a focal plane is formed in such a way that the diameter of a point spread function is larger than the size of 1 camera pixel, but smaller than the size of 6 camera pixels.

4. An apparatus for detecting a geometric distortion according to claim 1, wherein an exposure time of the camera is made 16 times or more as long as a vertical scanning period of the display device.

5. An apparatus for detecting a geometric distortion according to claim 1, further comprising means for detecting screen frame coordinates of the display device and means for calculating coordinates (x, y) on said camera means as a function of rectangular coordinates (A, B) on the screen of the display device.

6. An automatic convergence adjusting apparatus according to claim 3, wherein the width of each of said window images is set to be larger than half of the diameter of said point spread function.

7. A camera device equipped with dark-current eliminating means and detection sensitivity normalizing means, wherein said camera device operates to photograph and store a low-light field picture and a high-light field picture, said dark-current eliminating means including substructures, the substructures operating to first subtract a low-light field picture image from a high-light field picture image and to second subtract the low-light field picture image from an actual picture image, said detection sensitivity normalizing means including a divider, said divider operating to divide the second subtraction result by the first subtraction result, output signals of the camera device being formed by the output of said detection sensitivity normalizing means.

* * * * *

UNITED STATES PATENT AND TRADEMARK OFFICE
CERTIFICATE OF CORRECTION

PATENT NO. : 5,432,404
DATED : July 11, 1995
INVENTOR(S) : Masanori OGINO et al.

It is certified that error appears in the above-indentified patent and that said Letters Patent is hereby corrected as shown below:

On the title page, add item [30] as follows:
        Foreign   Application Priority Data Dec. 10, 1993  [JP]   Japan...............05-310114

Signed and Sealed this

Fourteenth Day of November, 1995

Attest:

BRUCE LEHMAN

*Attesting Officer*        *Commissioner of Patents and Trademarks*